(12) United States Patent
Bettenhausen

(10) Patent No.: US 6,234,512 B1
(45) Date of Patent: May 22, 2001

(54) TRAILER HITCH

(76) Inventor: Clark E. Bettenhausen, 752 W. Grove, West Point, NE (US) 68788

( * ) Notice: Subject to any disclaimer, the term of this patent is extended or adjusted under 35 U.S.C. 154(b) by 0 days.

(21) Appl. No.: 09/444,950

(22) Filed: Nov. 22, 1999

(51) Int. Cl.$^7$ .................................................. B60D 13/00
(52) U.S. Cl. .................................. 280/491.1; 280/491.5; 280/495
(58) Field of Search .................................. 280/472, 473, 280/491.1, 491.5, 495, 415.1, 416.1, 504

(56) References Cited

U.S. PATENT DOCUMENTS

| | | | |
|---|---|---|---|
| 2,747,892 | * | 5/1956 | Jones .................... 280/491.5 |
| 4,046,398 | * | 9/1977 | Dunwoody .............. 280/415.1 |
| 4,482,167 | * | 11/1984 | Haugrud ............... 280/491.3 |
| 4,614,353 | | 9/1986 | Mayer ................. 280/406 A |
| 4,709,940 | | 12/1987 | Mishler ............... 280/405 R |
| 5,476,279 | | 12/1995 | Klemetsen ............. 280/415.1 |
| 5,503,423 | | 4/1996 | Roberts et al. .......... 280/491.5 |
| 5,620,148 | * | 4/1997 | Borchers .............. 280/491.5 |
| 5,628,536 | | 5/1997 | Fulkerson .............. 293/117 |
| 5,647,621 | | 7/1997 | McClellan ............... 293/117 |
| 5,678,839 | | 10/1997 | Pobud, Jr. et al. ....... 280/491.5 |
| 5,850,959 | | 12/1998 | Miller ................... 224/535 |

* cited by examiner

*Primary Examiner*—Daniel G. DePumpo
(74) *Attorney, Agent, or Firm*—Zarley, McKee, Thomte, Voorhees & Sease; Dennis L. Thomte

(57) ABSTRACT

A trailer hitch for attachment to a towing vehicle comprises an elongated cross-beam which is secured to the frame of the vehicle and which has a hitch receiver extending rearwardly therefrom at the center thereof. The hitch receiver is adapted to removably receive an elongated tow bar therein to enable the vehicle to tow a trailer or the like. A tow bar support is secured to the cross-beam for removably receiving and supporting the tow bar therein when the tow bar is removed from the hitch receiver so that the longitudinal axis of the tow bar is disposed substantially parallel to the longitudinal axis of the cross-beam.

7 Claims, 3 Drawing Sheets

TRAILER HITCH

BACKGROUND OF THE INVENTION

1. Field of the Invention

This invention relates to a trailer hitch which is attached to a vehicle to allow the vehicle to tow trailers or the like and more particularly relates to a trailer hitch including means for stowing the tow bar when the tow bar is not positioned in the receiver of the hitch.

2. Description of the Related Art

Trailer hitches are commonly secured to the rear ends of vehicles to enable the vehicle to tow trailers or the like. Generally speaking, the trailer hitches comprise a cross-tube or cross-beam which is secured to the frame of the vehicle with the cross-beam having a rearwardly presented, hollow receiver into which an elongated tow bar is inserted. The elongated tow bar is normally secured to the receiver by means of a pin extending through the receiver and the tow bar. When so installed, the rearward end of the tow bar extends a considerable distance rearwardly of the receiver and the vehicle. When the trailer hitch is not being used to tow a trailer, the fact that the tow bar extends a considerable distance rearwardly of the receiver and the vehicle creates problems in that if the vehicle is being parallel parked, the rearward end of the tow bar may strike a vehicle which is parked rearwardly of the parking vehicle. Further, the rearwardly extending tow bar may sometimes interfere with the closing of a garage door if the vehicle is being parked within a garage. Yet another disadvantage of the rearwardly extending tow bar during periods of non-use is that a person walking behind the vehicle may bump into the protruding tow bar.

The problems associated with the rearwardly protruding tow bar are eliminated if the tow bar is removed from the receiver when the trailer hitch is not being used to pull a trailer or the like, but the removal of the tow bar from the receiver requires that the tow bar be stowed in the back of the vehicle or some other location. The stowage of the tow bar, when not in use, is a nuisance and the tow bar is sometimes lost or misplaced. One solution to the problems discussed hereinabove is found in U.S. Pat. No. 5,476,279 wherein the tow bar is stowed in one of the ends of the cross-beam. The structure described in U.S. Pat. No. 5,476,279 will only work with those trailer hitches wherein the cross-beam has open ends. Many of the cross-beams of conventional trailer hitches are closed, which prevents the structure of U.S. Pat. No. 5,476,279 being utilized. Further, in some trailer hitch designs, the outer ends of the cross-beam are closely located to the sides of the vehicle which would result in the tow bar, if stored in one of the ends of the cross-beam, protruding laterally from the vehicle which would present problems similar to that described hereinabove.

SUMMARY OF THE INVENTION

A trailer hitch is described for attachment to a towing vehicle with the trailer hitch comprising an elongated cross-beam having opposite ends, a lower end, an upper end, a forward side, and a rearward side. A hollow hitch receiver extends rearwardly from the cross-beam at the center length thereof and is adapted to removably receive an elongated tow bar therein. A hollow tow bar support is secured to the cross-beam for removably receiving and supporting the elongated tow bar therein when the tow bar is removed from the hitch receiver so that the longitudinal axis of the elongated tow bar is disposed substantially parallel to the longitudinal axis of the cross beam.

A principal object of the invention is to provide a trailer hitch including means for supporting the tow bar thereon when the tow bar is removed from the receiver of the trailer hitch.

Still another object of the invention is to provide a means for storing the tow bar of a trailer hitch when the tow bar is removed from the receiver of the trailer hitch.

Still another object of the invention is to provide a means for stowing the tow bar of a trailer hitch so that the longitudinal axis of the tow bar is disposed substantially parallel to the longitudinal axis of the cross-beam.

Still another object of the invention is to provide a trailer hitch including means for quickly and easily stowing the tow bar of the trailer hitch when the tow bar is removed from the hitch of the receiver so that the tow bar does not objectionally protrude either rearwardly or laterally from the trailer hitch.

Yet another object of the invention is to provide a tow bar support for a trailer hitch wherein the tow bar support may be secured to existing trailer hitches without substantial modification thereof.

These and other objects of the invention will be apparent to those skilled in the art.

DESCRIPTION OF THE PREFERRED EMBODIMENT

Figure 1:
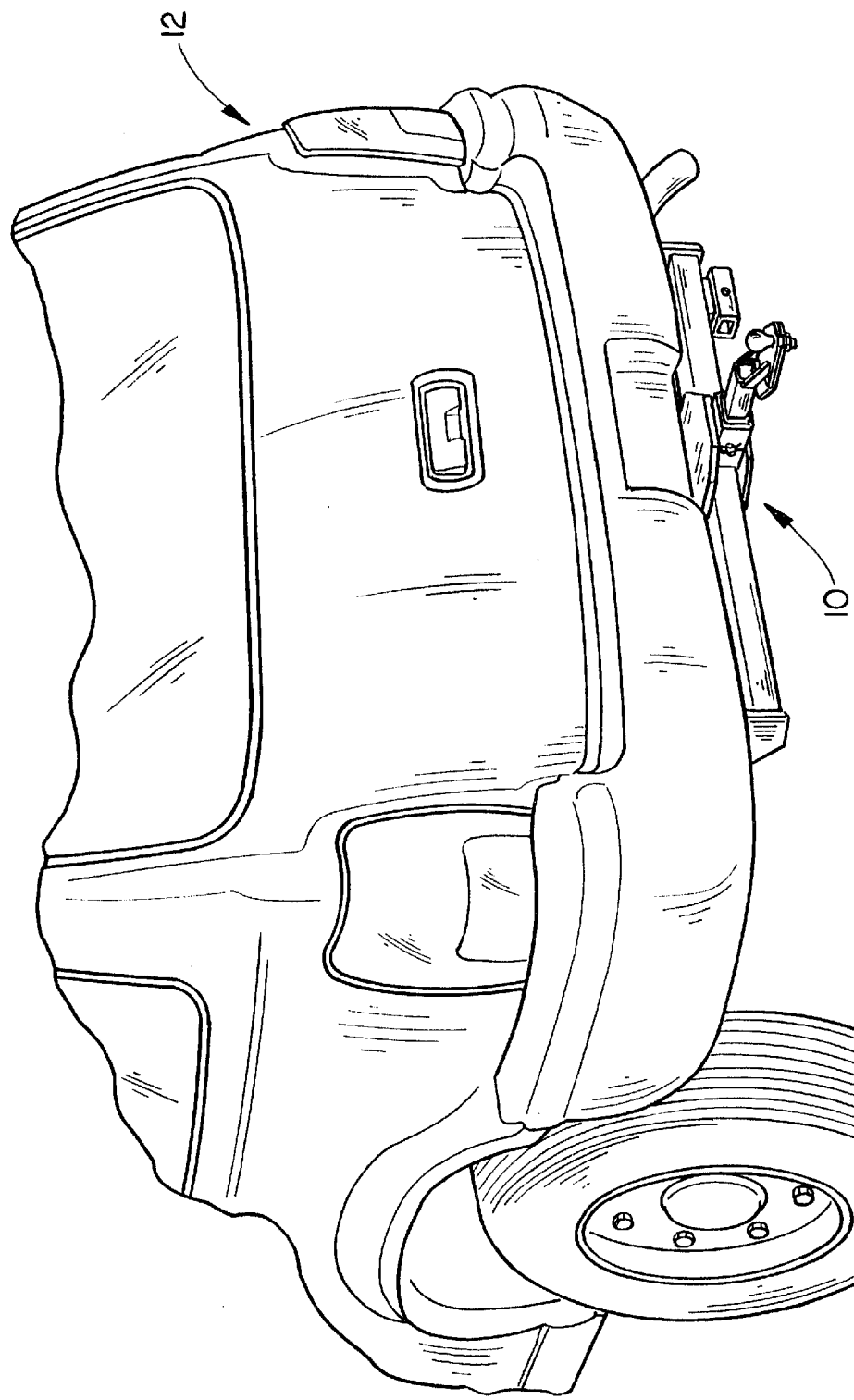
FIG. 1 is a rear perspective view of a vehicle having the trailer hitch of this invention mounted thereon.
Figure 2:
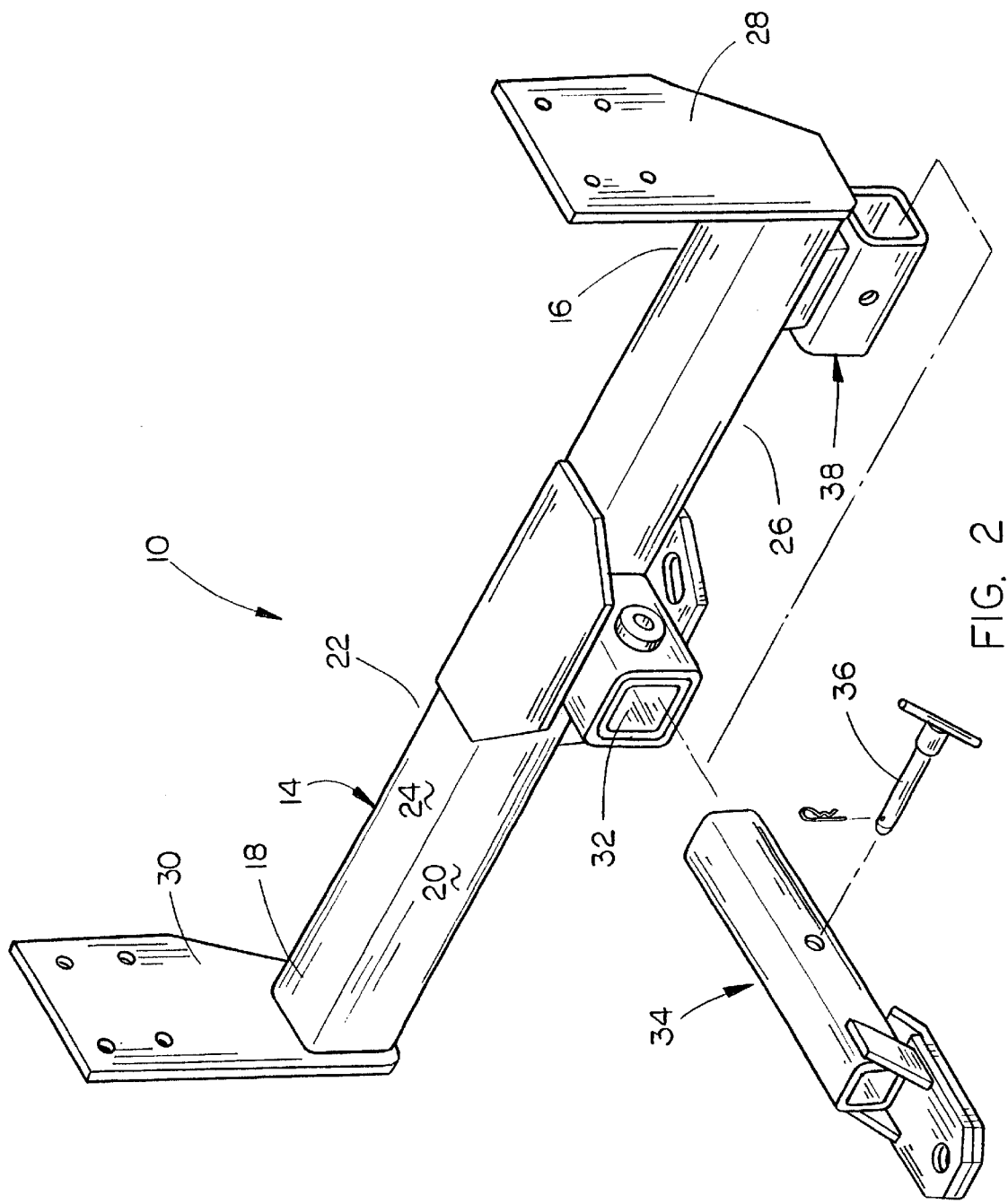
FIG. 2 is a rear perspective view of the trailer hitch of this invention.

The trailer hitch of this invention is referred to generally by the reference numeral 10 and is adapted to be secured to the rearward end of a vehicle 12. Trailer hitch 10 includes an elongated cross-beam or cross-tube 14 having opposite ends 16 and 18, rearward side 20, forward side 22, upper end 24, and lower end 26. The cross-beam 14 is secured to the frame of the vehicle by at least a pair of mounting plates or bars 28 and 30 which are normally welded to the ends of the cross-beam 14 and which extend forwardly therefrom.

Hitch 10 is provided with a conventional rearwardly extending receiver 32 which is adapted to receive the forward end of an elongated tow bar 34. The tow bar 34 is maintained within the receiver 32 by means of a conventional pin 36 extending through the receiver and through the tow bar 34.

Thus, when the tow bar 34 is mounted in the receiver 32, the rearward end of the tow bar protrudes a considerable distance rearwardly of the vehicle and presents the problems discussed hereinabove. To eliminate the problem of stowing the tow bar 34 when the tow bar 34 is not installed in the receiver 32, a hollow tow bar support 38 is secured to the cross-beam 14 by welding or the like. The preferred location of the tow bar support 38 is at one end of the cross-beam 14 at the lower end thereof, as illustrated in the drawings. However, if desired, the tow bar support 38 could be positioned intermediately between the receiver 32 and either end of the cross-beam 14 or positioned at the center of the cross-beam 14. Further, the tow bar support 38 could be secured to the rearward side of the cross-beam 14 at one end thereof or positioned intermediate of one end of the cross-beam 14 and the receiver 32.

Figure 3:
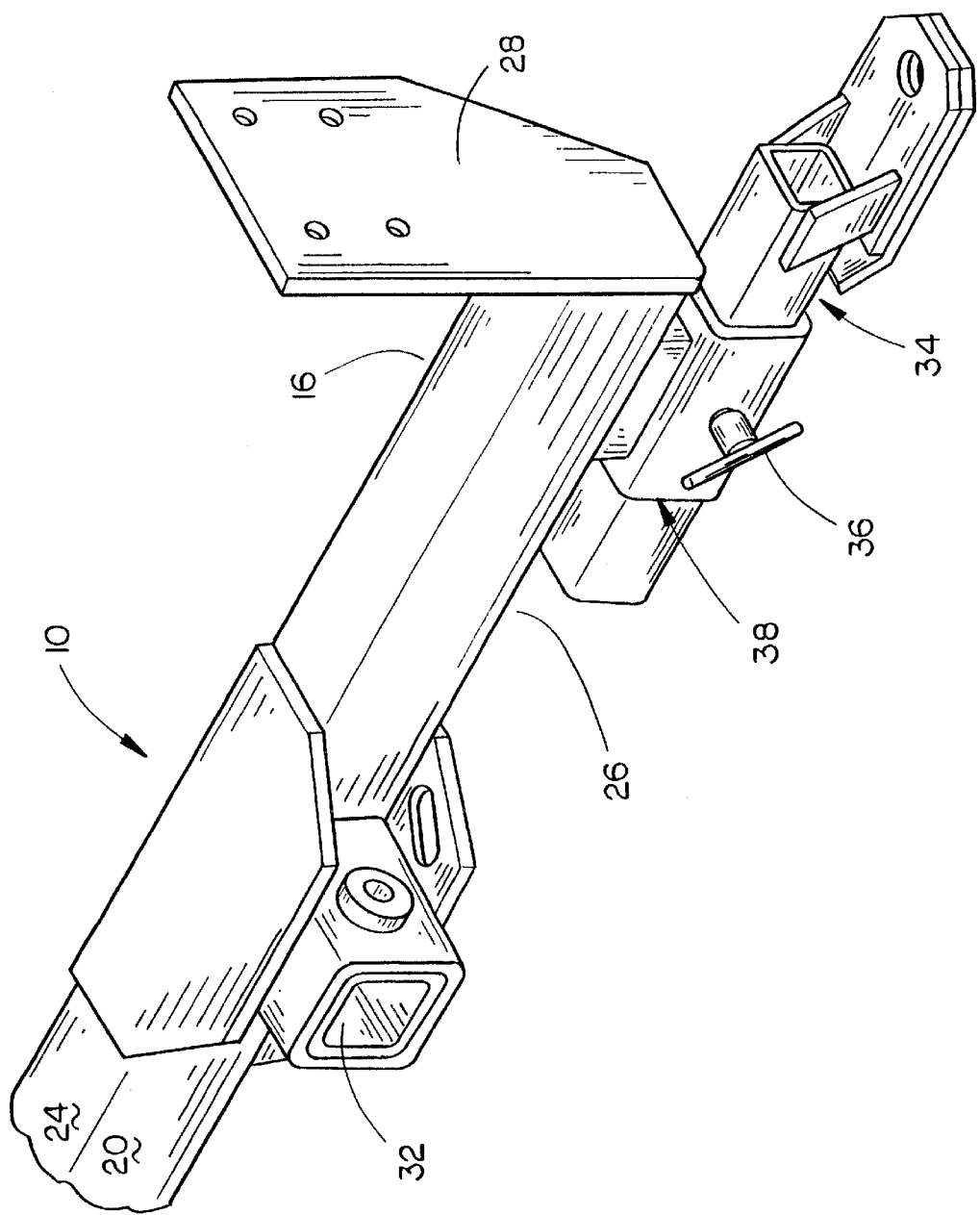
FIG. 3 is a rear perspective view of the trailer hitch of this invention with the tow bar in its stowed condition.

Tow bar support 38 is hollow, as stated, and has its longitudinal axis disposed parallel to the longitudinal axis of the cross-beam 14. Preferably, the interior of tow bar support 38 has the same dimensions as the interior of the receiver 32 and has the same configuration as receiver 32 so that the elongated tow bar 34 may be slidably received in the tow bar support 38, as illustrated in FIG. 3, so that the longitudinal axis of the tow bar 38 is disposed parallel to the longitudinal axis of the cross-beam 14. However, a cylindrical tow bar support could be utilized if the interior diameter thereof was large enough to receive the square tow bar 34 therein.

Preferably, tow bar support 38 has openings formed in its rearward and forward sides which are adapted to receive the pin 36 therein and which are adapted to extend through an opening in the tow bar 34 so that the tow bar 34 is maintained in the tow bar support 38. However, the openings in the tow bar support 38 may be omitted if the tow bar 34 has an opening formed therein which would be positioned inwardly of the inner end of the tow bar support to enable a pin to be inserted therethrough. As seen in the drawings, when the tow bar 34 is installed in the tow bar support 38, the end of the tow bar 34 does not objectionally protrude laterally of the vehicle. The tow bar support 38 provides a convenient means for stowing the tow bar 34 when the tow bar 34 is not installed in the receiver 32.

Thus it can be seen that the trailer hitch of this invention accomplishes at least all of its stated objectives.

I claim:

1. A trailer hitch for attachment to a towing vehicle including a forward end, a rearward end, and opposite sides, comprising:

an elongated cross-beam having opposite ends, an upper end, a lower end, a forward side, and a rearward side;

a hitch receiver extending rearwardly from said cross-beam at the center length thereof adapted to removably receive an elongated tow bar therein;

a tow bar support having first and second ends, an interior and exterior surface, said interior surface defining a central opening extending between said first and second ends of said tow bar support; said tow bar support being secured to said cross-beam for removably receiving and supporting the elongated tow bar when the tow bar is removed from said hitch receiver so that the longitudinal axis of the elongated tow bar is disposed apart from but substantially parallel to the longitudinal axis of said cross-beam.

2. The trailer hitch of claim 1 wherein said tow bar support is secured to said cross-beam between said hitch receiver and one of the ends of said cross-beam.

3. The trailer hitch of claim 1 wherein said tow bar support is secured to said lower end of said cross-beam.

4. The trailer hitch of claim 3 wherein said tow bar support is secured to said cross-beam between said hitch receiver and one of said ends of said cross-beam.

5. The trailer hitch of claim 1 further including means for selectively removably securing the tow bar in said tow bar support.

6. The trailer hitch of claim 1 wherein said tow bar support is secured to said cross-beam adjacent one of the ends thereof.

7. The trailer hitch of claim 1 wherein said hitch receiver has a tubular configuration and wherein said tow bar support has a tubular configuration substantially similar to the tubular configuration of said hitch receiver.

* * * * *